(12) United States Patent
Yamashita et al.

(10) Patent No.: US 8,744,223 B2
(45) Date of Patent: Jun. 3, 2014

(54) ARRAY-TYPE PHOTO MODULE

(75) Inventors: Yuto Yamashita, Sendai (JP); Keiichi Sasaki, Sendai (JP); Etsuo Ogino, Sendai (JP); Yasuaki Tamura, Yokohama (JP); Yuji Akahori, Yokohama (JP); Yuichi Suzuki, Yokohama (JP)

(73) Assignees: Kitanihon Electric Cable Co., Ltd., Miyagi (JP); NTT Electronics Corporation, Kanagawa (JP)

( * ) Notice: Subject to any disclaimer, the term of this patent is extended or adjusted under 35 U.S.C. 154(b) by 187 days.

(21) Appl. No.: 13/410,131

(22) Filed: Mar. 1, 2012

(65) Prior Publication Data
US 2012/0257855 A1    Oct. 11, 2012

(30) Foreign Application Priority Data

Apr. 11, 2011    (JP) ................... 2011-086943

(51) Int. Cl.
*G02B 6/32*    (2006.01)
(52) U.S. Cl.
USPC .......................................................... 385/33
(58) Field of Classification Search
None
See application file for complete search history.

(56) References Cited

U.S. PATENT DOCUMENTS

| | | | |
|---|---|---|---|
| 4,825,063 A | 4/1989 | Halldorsson et al. | |
| 6,809,813 B2* | 10/2004 | Bennett et al. | 356/301 |
| 7,255,497 B2* | 8/2007 | Suzuki et al. | 385/93 |
| 2002/0114565 A1* | 8/2002 | Francis | 385/33 |
| 2004/0234204 A1* | 11/2004 | Brun et al. | 385/39 |
| 2005/0008292 A1* | 1/2005 | Wang et al. | 385/33 |

FOREIGN PATENT DOCUMENTS

| | | |
|---|---|---|
| CN | 1369721 A | 9/2002 |
| CN | 101088048 A | 12/2007 |
| CN | 202693860 U | 1/2013 |
| JP | 02-141709 | 5/1990 |
| JP | 3798408 | 4/2006 |
| JP | 2007-057859 | 3/2007 |
| JP | 2007-206584 | 8/2007 |

OTHER PUBLICATIONS

English translation of Chinese Office Action dated Jan. 6, 2014 corresponding to Chinese App. No. 201210103726.9, 5 pp.

* cited by examiner

*Primary Examiner* — Sung Pak
(74) *Attorney, Agent, or Firm* — Ohlandt Greeley Ruggiero & Perle L.L.P.

(57) ABSTRACT

The present invention provides an array-type photo module including a filter, which, in each channel, transmits therethrough a portion of emitted light from an incident optical fiber on the opposite side of a gradient-index lens array and reflects another portion of the emitted light from the incident optical fiber toward the gradient-index lens array, and a light-shielding member which is arranged on the opposite side of the filter from the gradient-index lens array, so as to be spaced from the filter and, in each channel, has an opening passing therethrough transmitted light from the filter on the opposite side of the filter. The array-type photo module is easily and inexpensively manufactured, and may be used in a high-density array, with low crosstalk.

6 Claims, 19 Drawing Sheets

FIG. 12

| WAVELENGTH (nm) | T1(%) | R11(%) | R12(%) | T2(%) | R21(%) | R22(%) |
|---|---|---|---|---|---|---|
| 1510 | 0.01 | 0.12 | 0.32 | 0.01 | 0.35 | 0.10 |
| 1550 | 0.02 | 0.21 | 0.37 | 0.01 | 0.41 | 0.14 |
| 1610 | 0.03 | 0.28 | 0.49 | 0.02 | 0.55 | 0.22 |

FIG. 13

| | WAVELENGTH (nm) | REFLECTANCE | | | TRANSMITTANCE | | |
|---|---|---|---|---|---|---|---|
| | | P WAVE (%) | S WAVE (%) | POLARIZATION DEPENDENCE (dB) | P WAVE (%) | S WAVE (%) | POLARIZATION DEPENDENCE (dB) |
| FIRST | 1510 | 93.66 | 93.72 | 0.003 | 5.73 | 5.67 | 0.046 |
| | 1550 | 93.63 | 93.65 | 0.001 | 5.77 | 5.75 | 0.015 |
| | 1610 | 93.81 | 93.84 | 0.001 | 5.45 | 5.42 | 0.024 |
| SECOND | 1510 | 87.70 | 87.95 | 0.012 | 7.04 | 6.89 | 0.094 |
| | 1550 | 87.74 | 87.98 | 0.012 | 7.07 | 6.93 | 0.087 |
| | 1610 | 87.69 | 87.91 | 0.011 | 7.15 | 7.02 | 0.080 |
| THIRD | 1510 | 92.36 | 93.13 | 0.036 | 7.35 | 6.58 | 0.481 |
| | 1550 | 92.33 | 93.08 | 0.035 | 7.37 | 6.62 | 0.466 |
| | 1610 | 92.35 | 93.11 | 0.036 | 7.40 | 6.63 | 0.477 |

FIG. 14

| OUTPUT PORT | ch1 | ch2 | ch3 | ch4 | ch5 | ch6 | ch7 | ch8 |
|---|---|---|---|---|---|---|---|---|
| OPTICAL LOSS AMOUNT (dB) | 0.50 | 0.46 | 0.47 | 0.54 | 0.48 | 0.48 | 0.46 | 0.48 |

FIG. 16

TWO LIGHT-SHIELDING MEMBERS

| | 1ST CH | 2ND CH | 3RD CH | 4TH CH | 5TH CH | 6TH CH | 7TH CH | 8TH CH |
|---|---|---|---|---|---|---|---|---|
| 1ST CH | | 42.4 | | | | | | |
| 2ND CH | 42.9 | | 45.5 | | | | | |
| 3RD CH | | 41.5 | | 43.4 | | | | |
| 4TH CH | | | 42.7 | | 45.1 | | | |
| 5TH CH | | | | 42.9 | | 45.4 | | |
| 6TH CH | | | | | 42.7 | | 44.9 | |
| 7TH CH | | | | | | 43.1 | | 45.1 |
| 8TH CH | | | | | | | 40.5 | |

SINGLE LIGHT-SHIELDING MEMBER

| | 1ST CH | 2ND CH | 3RD CH | 4TH CH | 5TH CH | 6TH CH | 7TH CH | 8TH CH |
|---|---|---|---|---|---|---|---|---|
| 1ST CH | 37.1 | | | | | | | |
| 2ND CH | | 41.2 | | | | | | |
| 3RD CH | | 37.1 | 41.3 | | | | | |
| 4TH CH | | | 37.4 | 42.2 | | | | |
| 5TH CH | | | | 37.4 | 41.7 | | | |
| 6TH CH | | | | | 37.4 | 41.3 | | |
| 7TH CH | | | | | | 37.3 | 41.8 | |
| 8TH CH | | | | | | | 37.3 | 41.1 |

NO LIGHT-SHIELDING MEMBER                                    [dB]

|        | 1ST CH | 2ND CH | 3RD CH | 4TH CH | 5TH CH | 6TH CH | 7TH CH | 8TH CH |
|--------|--------|--------|--------|--------|--------|--------|--------|--------|
| 1ST CH | 22.6   | 26.2   |        |        |        |        |        |        |
| 2ND CH |        | 23.5   | 19.4   |        |        |        |        |        |
| 3RD CH |        |        | 23.1   | 19.1   |        |        |        |        |
| 4TH CH |        |        |        | 21.5   | 18.5   |        |        |        |
| 5TH CH |        |        |        |        | 20.7   | 18.7   |        |        |
| 6TH CH |        |        |        |        |        | 20.1   | 18.3   |        |
| 7TH CH |        |        |        |        |        |        | 18.7   | 17.6   |
| 8TH CH |        |        |        |        |        |        |        |        |

ARRAY-TYPE PHOTO MODULE

TECHNICAL FIELD

The present invention relates to a technique of easily and inexpensively manufacturing an array-type photo module that measures a signal strength of each channel.

BACKGROUND ART

As a multiplexing system in optical fiber communication, there is wavelength division multiplexing system. If a signal strength of each wavelength channel of a wavelength division multiplexing signal is uneven, S/N of each wavelength channel of the wavelength division multiplexing signal is uneven, and a sufficient system margin cannot be secured. Thus, the signal strength of each wavelength channel of the wavelength division multiplexing signal is measured using an array-type photo module. Then, the signal strength of each wavelength channel of the wavelength division multiplexing signal is adjusted based on the measuring result, using an erbium-doped optical fiber amplifier.

A photo module measuring the signal strength of a single wavelength channel is disclosed in Patent Documents 1 to 4. The array-type photo module measuring the signal strength of a plurality of the wavelength channels can be manufactured by arraying these photo modules.

A line monitor disclosed in Patent Document 1 is constituted of an incident optical fiber, an emitting optical fiber, a rod lens, a reflective film including a light-transmitting portion, and a received light detection element. An optical signal of a single wavelength channel reaches the reflective film through the incident optical fiber and the rod lens. The optical signal reaching the light-transmitting portion of the reflective film is detected by the received light detection element. The optical signal reaching a reflective portion of the reflective film is output to a transmission path through the rod lens and the emitting optical fiber.

Optical transmitter and receiver modules disclosed in Patent Document 2 is constituted of a light-emitting element, a light-receiving element, a wavelength selection filter, an optical fiber, and a wall surface including a drilled hole. A transmission optical signal is generated in the light-emitting element to be rendered monochromatic in the wavelength selection filter, and, thus, to be sent to the optical fiber. A reception optical signal is received from the optical fiber to be reflected by the wavelength selection filter, and, thus, to be detected by the light-receiving element. The transmission optical signal could be input to the light-receiving element when reflected by the wavelength selection filter. Thus, the drilled hole is arranged on the wall surface between the light-emitting element and the wavelength selection filter, whereby the transmission optical signal reflected by the wavelength selection filter is reflected by the drilled hole of the wall surface to thereby be prevented from being input to the light-receiving element.

An unidirectional optical power monitor disclosed in Patent Document 3 is constituted of an incident optical fiber, an emitting optical fiber, a GRIN lens, a tap film, an optical diode, and a sleeve. In the sleeve, the central axis of a circular hole into which the GRIN lens and the optical diode are inserted and mounted is deviated. An optical signal of a single wavelength channel reaches the tap film through the incident optical fiber and the GRIN lens. The optical signal transmitted through the tap film is detected by the optical diode. The optical signal reflected by the tap film is output to a transmission path through the GRIN lens and the emitting optical fiber. Although the optical signal from the incident optical fiber should be detected by the optical diode, return light from the emitting optical fiber may be detected by the optical diode. Thus, an intermediate wall is arranged at a connecting position of the circular hole into which the GRIN lens and the optical diode are inserted and mounted, whereby the return light from the emitting optical fiber is reflected by the intermediate wall to thereby be prevented from being input to the optical diode.

An optical monitor module disclosed in Patent Document 4 is constituted of an incident optical fiber, an emitting optical fiber, a lens portion for incidence, a lens portion for emission, a beam splitter, and a photo diode. An optical signal of a single wavelength channel reaches the beam splitter through the incident optical fiber and the lens portion for incidence. The optical signal transmitted by the beam splitter is detected by the photo diode. The optical signal reflected by the beam splitter is output to a transmission path through the lens portion for emission and the emitting optical fiber. Since the optical signal emitted from the lens portion for incidence is guided in the direction of the beam splitter, the inclination angle with respect to the central axis of the lens portion for incidence at the emitting end of the lens portion for incidence is adjusted. Since the optical signal reflected by the beam splitter is guided in the direction of the emitting optical fiber, the inclination angle with respect to the central axis of the lens portion for emission at the incident end of the lens portion for emission is adjusted.

PRIOR ART DOCUMENTS

Patent Document

Patent Document 1: Japanese Patent Application Laid-Open No. 2-141709
Patent Document 2: Japanese Patent Application Laid-Open No. 2007-057859
Patent Document 3: Japanese Patent Application Laid-Open No. 2007-206584
Patent Document 4: Japanese Patent No. 3798408

DISCLOSURE OF THE INVENTION

Problems to be Solved by the Invention

The array-type photo module measuring the signal strength of a plurality of wavelength channels can be manufactured by arraying the photo module disclosed in Patent Documents 1 to 4 and measuring the signal strength of a single wavelength channel. However, many processes are required, and the array-type photo module cannot be easily and inexpensively manufactured and cannot be miniaturized.

In the line monitor disclosed in Patent Document 1, the arrangement position of the light-transmitting portion in the reflective film with a small area is required to be set precisely. In the optical transmitter and receiver modules disclosed in Patent Document 2, the arrangement position of the drilled hole on the wall surface with a small area is required to be set precisely. In the unidirectional optical power monitor disclosed in Patent Document 3, the central axis of the circular hole in which the GRIN lens and the optical diode are inserted and mounted is required to be deviated, and the structure is complex, so that processing is difficult. In the optical monitor module disclosed in Patent Document 4, the inclination angle with respect to the central axis of the lens portion for incidence at the emitting end of the lens portion for incidence is required to be adjusted precisely, and the inclination angle with respect to the central axis of the lens portion for emission at the incident end of the lens portion for emission is required to be adjusted precisely.

The array-type photo module measuring the signal strength of a plurality of wavelength channels can be manufactured by applying the line monitor disclosed in Patent Document 1 and arranging the optical fiber array and the light-receiving element array. In order to prevent crosstalk between the respective wavelength channels of a wavelength division multiplexing signal, in the light-receiving element array, the arrangement position of a pinhole is required to be set precisely. However, in packaging of the light-receiving elements, airtight sealing processing of the light-receiving element and the precise arrangement of the pinhole are required to be performed simultaneously. Accordingly, the array-type photo module cannot be easily and inexpensively manufactured, and high-density array and low crosstalk cannot be coexisted.

In order to solve the above problems, an object of the present invention is to easily and inexpensively manufacture an array-type photo module that measures the signal strength of each channel and coexist high-density array and low crosstalk.

Means for Solving Problems

In order to achieve the above object, one or a plurality of light-shielding members are provided between a filter and a light-receiving element array, and in each channel, one or a plurality of the light-shielding members have an opening on a straight line connecting the transmission position of a filter and a light-receiving element.

Specifically, the present invention provides an array-type photo module including: an optical fiber array which, in each channel, has a pair of an incident optical fiber guiding incident light and an emitting optical fiber guiding emitting light; a gradient-index lens array which, in each channel, has a gradient-index lens of approximately x/4 cycle length (x is an odd number), which is joined to an emitting end of the incident optical fiber and an incident end of the emitting optical fiber and has at its central axis a symmetric axis of an optical axis of the emitting light from the incident optical fiber and the optical axis of the incident light to the emitting optical fiber; a filter which is joined to an opposite end of the optical fiber array of the gradient-index lens array, and in each channel, transmits therethrough a portion of the emitting light from the incident optical fiber on the opposite side of the gradient-index lens array and reflects another portion of the emitting light from the incident optical fiber toward the gradient-index lens array; and a light-shielding member which is arranged on the opposite side of the gradient-index lens array of the filter, and in each channel, has an opening through which transmitted light from the filter passes on the opposite side of the filter.

Further, the present invention provides an array-type photo module including a light-receiving element array which, in each channel, has a light-receiving element, which is arranged on the opposite side of the filter of the light-shielding member, at the same time, arranged on an extended line connecting a transmission position in the filter and the opening of the light-shielding member, and measures a strength of light passing through the light-shielding member.

According to the above constitution, just by adjusting the arrangement position of the opening of the light-shielding member in each channel, the array-type photo module measuring the signal strength of each channel can be easily and inexpensively manufactured, and, in addition, the high-density array and the low crosstalk can be coexisted.

Furthermore, the present invention provides an array-type photo module, wherein the light-shielding member is a plurality of light-shielding members arranged to be spaced from each other, and in each channel, the opening of the plurality of light-shielding members and the transmission position of the filter are arranged on a straight line.

According to the above constitution, just by providing the plurality of light-shielding members in each channel, the array-type photo module measuring the signal strength of each channel can be easily and inexpensively manufactured, and, in addition, the high-density array and the low crosstalk can be further coexisted.

Furthermore, the present invention provides an array-type photo module, wherein in the incident optical fiber and the emitting optical fiber of the optical fiber array, the gradient-index lens of the gradient-index lens array, and the opening of the light-shielding member, the arrangement direction and the arrangement interval are the same.

According to the above constitution, just by arranging light guiding directions in a line in parallel to each other in each channel, the array-type photo module measuring the signal strength of each channel can be manufactured more easily and more inexpensively, and, in addition, the high-density array and the low crosstalk can be coexisted.

Furthermore, the present invention provides an array-type photo module, wherein the light-shielding member has a multi-layer structure including at least one of a $SiO_2$ film and a $Ta_2O_5$ film and a Ti film.

According to the above constitution, since transmission and an interface reflection in the light-shielding member can be suppressed, the low crosstalk can be further realized.

Furthermore, the present invention provides an array-type photo module, wherein the filter has a multi-layer structure including at least one of a $SiO_2$ film and a $Ta_2O_5$ film and a Si film or a multi-layer structure including at least one of the $SiO_2$ film and the $Ta_2O_5$ film and an Au film.

According to the above constitution, even when a light beam obliquely enters a filter, with regard to the transmission property and the reflection property of the filter, polarization dependence can be suppressed inexpensively by a simple film structure.

Effects of the Invention

According to the present invention, an array-type photo module measuring the signal strength of each channel can be easily and inexpensively manufactured, and, in addition, the high-density array and the low crosstalk can be coexisted.

BRIEF DESCRIPTION OF THE DRAWINGS

FIG. 12 is a view showing numerical values of the transmission component and the reflection component of the light-shielding member.

FIG. 13 is a view showing numerical values of a reflection component, a transmission component, and polarization characteristics of a filter.

FIG. 14 is a view showing numerical values of an optical loss amount of the array-type photo module.

FIG. 16 is a view showing numerical values of adjacent crosstalk when two light-shielding members are arranged.

FIG. 17 is a view showing numerical values of the adjacent crosstalk when a single light-shielding member is arranged.

FIG. 18 is a view showing numerical values of the adjacent crosstalk when no light-shielding member is arranged.

MODE FOR CARRYING OUT THE INVENTION

Figure 1:
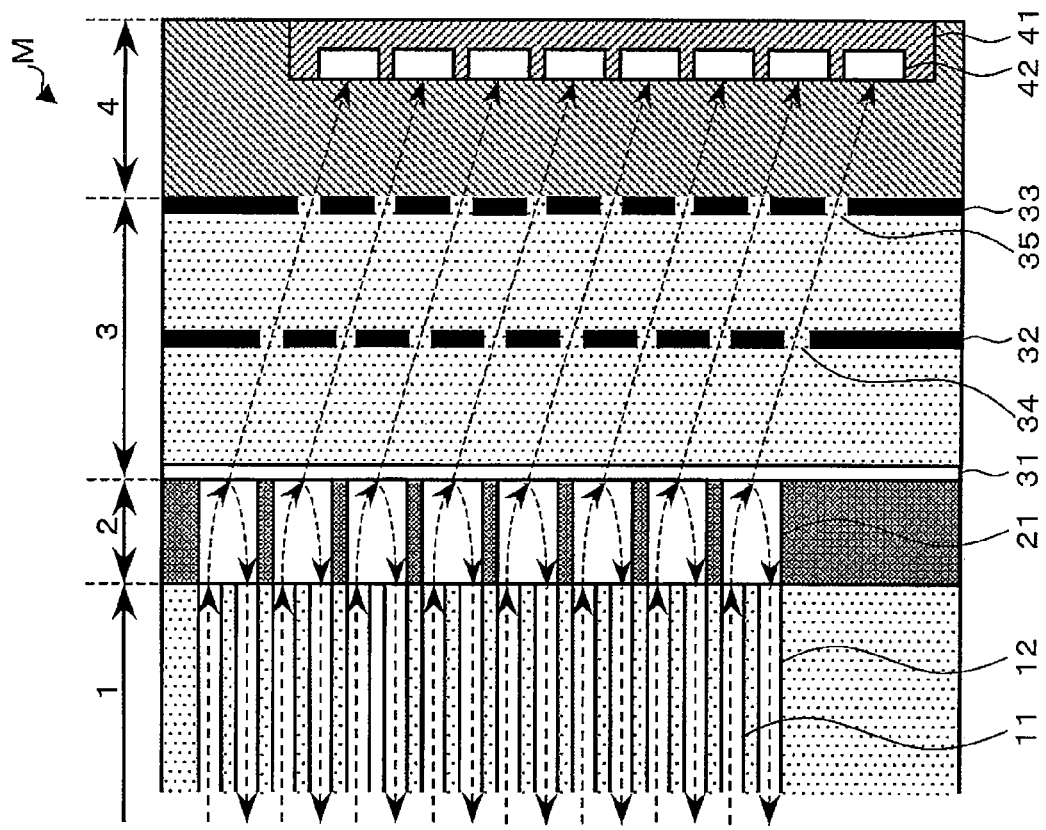
FIG. 1 is a view showing a constitution of an array-type photo module.

An embodiment of the present invention will be described with reference to the appended drawings. The embodiment described hereinafter is an embodiment of the present invention, and the present invention is not limited to the following embodiment. The components assigned the same reference numerals in the present specification and the drawings are the same.

(Constitution of Array-type Photo Module)

FIG. 1 shows a constitution of an array-type photo module. An array-type photo module M is constituted of an optical fiber array 1, a gradient-index lens array 2, a light-shielding member package 3, and a light-receiving element package 4 and responds to eight wavelength channels of a wavelength division multiplexing signal. Dashed arrows show each light guiding direction of an optical signal in the eight wavelength channels of the wavelength division multiplexing signal.

In each of the eight wavelength channels of the wavelength division multiplexing signal, the optical fiber array 1 has a pair of an incident optical fiber 11 guiding incident light and an emitting optical fiber 12 guiding emitting light. The gradient-index lens array 2 has a gradient-index lens 21 of approximately x/4 cycle length (x is an odd number), which is connected to the emitting end of the incident optical fiber 11 and the incident end of the emitting optical fiber 12 and has at its central axis a symmetric axis of an optical axis of emitting light from the incident optical fiber 11 and the optical axis of incident light to the emitting optical fiber 12. The approximately x/4 cycle length is a concept that x/4 cycle length includes a tolerance.

The light-shielding member package 3 is constituted of a filter 31 and light-shielding members 32 and 33. Although the two light-shielding members are arranged in FIG. 1, one or a plurality of light-shielding members may be provided.

The filter 31 is connected to an opposite end of the optical fiber array 1 of the gradient-index lens array 2. In each of the eight wavelength channels of the wavelength division multiplexing signal, the filter 31 transmits therethrough a portion of the emitting light from the incident optical fiber 11 on the opposite side of the gradient-index lens array 2 and reflects another portion of the emitting light from the incident optical fiber 11 toward the gradient-index lens array 2.

A light-shielding member 32 (33) is arranged on the opposite side of the gradient-index lens array 2 of the filter 31 so as to be spaced from the filter 31 and has openings 34 (35). In each of eight wavelength channels of the wavelength division multiplexing signal, transmitted light from the filter 31 passes through the openings 34 and 35 to reach the opposite side of the filter 31.

The light-receiving element package 4 is constituted of a light-receiving element array 41. In each of the eight wavelength channels of the wavelength division multiplexing signal, the light-receiving element array 41 has a light-receiving element 42, which is arranged on the opposite side of the filter 31 of the light-shielding members 32 and 33 so as to be spaced from the light-shielding members 32 and 33, arranged on an extended line connecting the transmission position of the filter 31 to the openings 34 and 35 of the light-shielding members 32 and 33, and measures a strength of light passing through the light-shielding members 32 and 33.

The light-shielding members 32 and 33 are arranged to be spaced from each other. In each of the eight wavelength channels of the wavelength division multiplexing signal, the openings 34 and 35 of the light-shielding members 32 and 33 and the transmission position of the filter 31 are arranged on a straight line.

In the incident optical fiber 11 and the emitting optical fiber 12 of the optical fiber array 1, the gradient-index lens 21 of the gradient-index lens array 2, the openings 34 and 35 of the light-shielding members 32 and 33, and the light-receiving element 42 of the light-receiving element array 41, the arrangement direction and the arrangement interval are the same.

As described above, one or a plurality of light-shielding members are provided between the filter 31 and the light-receiving element array 41, and in each wavelength channel of the wavelength division multiplexing signal, one or a plurality of light-shielding members have openings on a straight line connecting the transmission position of the filter 31 and the light-receiving element 42.

In each wavelength channel of the wavelength division multiplexing signal, just by adjusting the arrangement position of the openings of the light-shielding member, while a path through which an optical signal of a first wavelength channel enters the light-receiving element corresponding to the first wavelength channel exists, a path through which an optical signal of a second wavelength channel enters the light-receiving element corresponding to the first wavelength channel can be prevented from existing. Accordingly, the array-type photo module M can be easily and inexpensively manufactured, and, in addition, high-density array and low crosstalk can be coexisted.

Further, in each wavelength channel of the wavelength division multiplexing signal, a plurality of light-shielding members are provided, whereby crosstalk can be reduced in comparison with the provision of a single light-shielding member.

Figure 2:
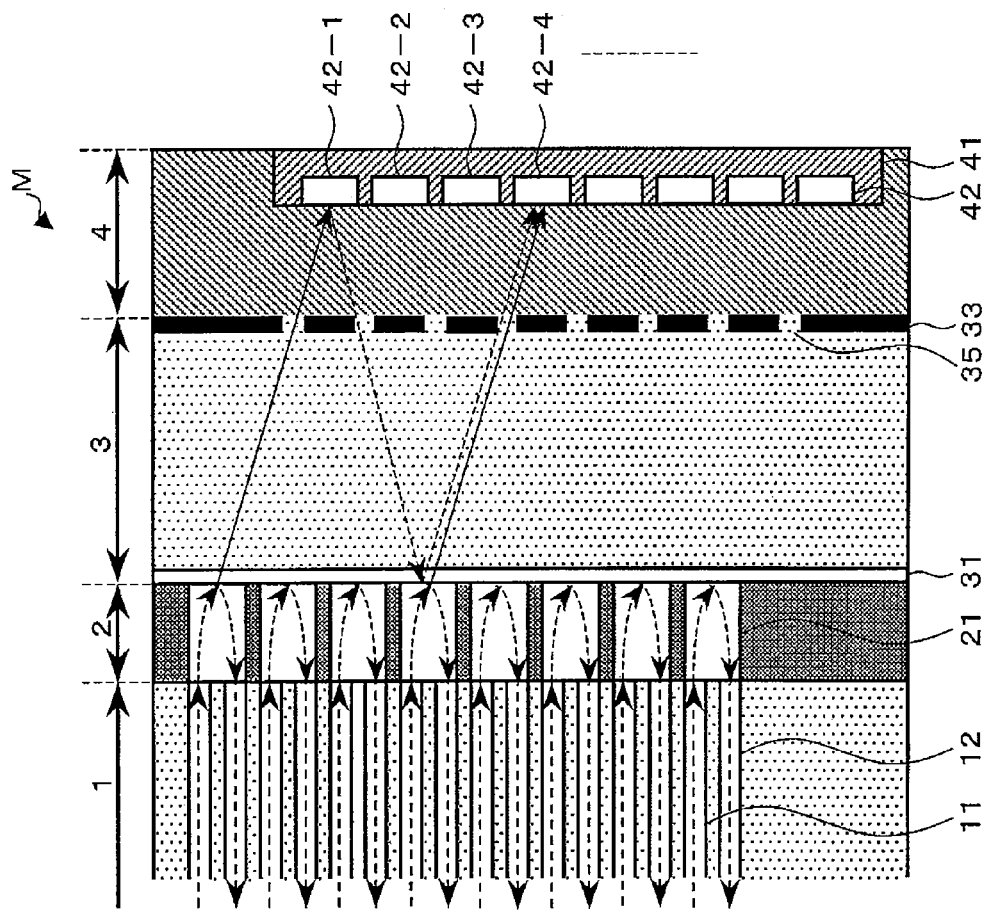
FIG. 2 is a view showing an example of a path of an optical signal when a single light-shielding member is provided.

FIG. 2 shows an example of a path of the optical signal when a single light-shielding member is provided. A portion of the optical signal shown by the solid line enters a light-receiving surface of a light-receiving element 42-1 to be reflected by the light-receiving surface of the light-receiving element 42-1. Then, the optical signal reflected by the light-receiving surface of the light-receiving element 42-1 passes through one of the openings 35 to be multiply reflected on the filter 31, and, thus, to pass through another opening 35 as shown by the dashed line, whereby the optical signal may enter a light-receiving surface of a light-receiving element 42-4. Namely, the optical signal shown by the solid line and the dashed line and entering the light-receiving element 42-4 may cause the crosstalk.

Figure 3:
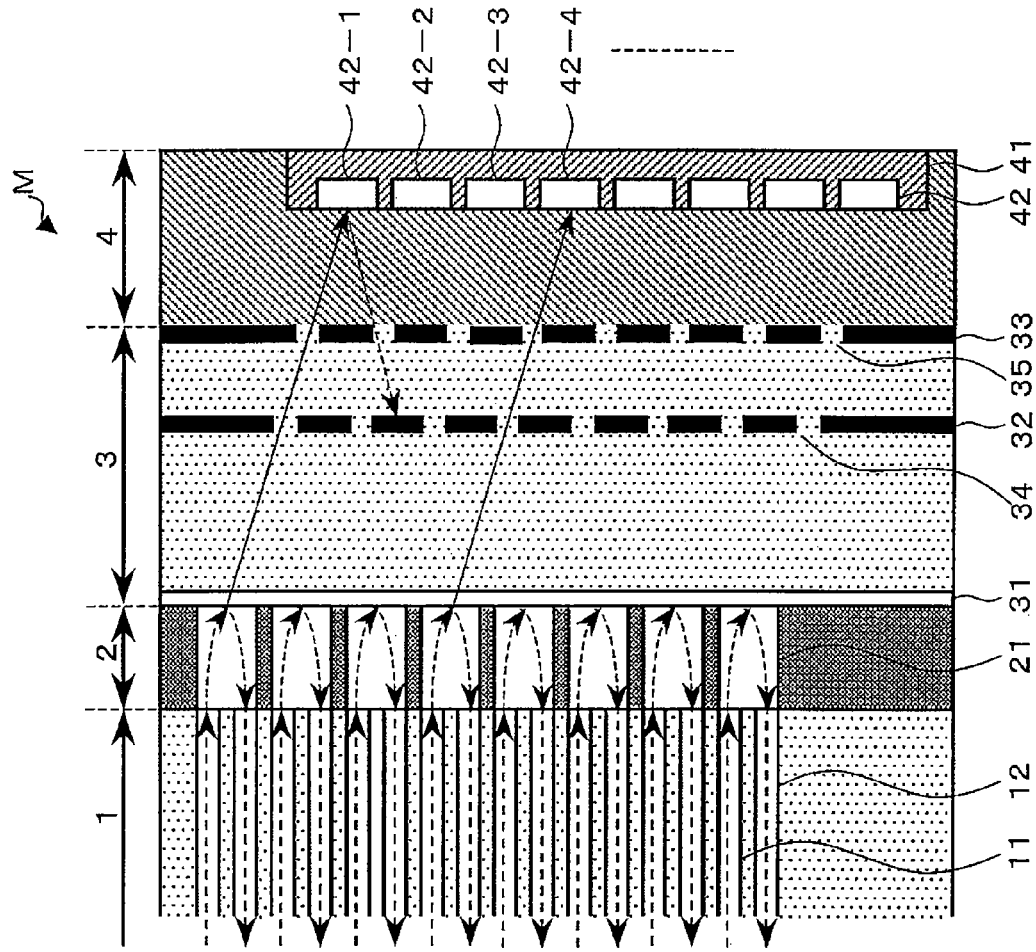
FIG. 3 is a view showing an example of the path of the optical signal when two light-shielding members are provided.

FIG. 3 shows an example of the path of the optical signal when two light-shielding members are provided. A portion of the optical signal shown by the solid line enters the light-receiving surface of the light-receiving element 42-1 to be reflected by the light-receiving surface of the light-receiving element 42-1. However, even if the optical signal reflected by the light-receiving surface of the light-receiving element 42-1 passes through the opening 35 without being shielded by the light-shielding member 33 as shown by the dashed line, the optical signal can be shielded by the light-shielding member 32 without passing through the opening 34. Namely, the optical signal shown by the solid line and entering the light-receiving elements 42-1 and 42-4 can prevent the occurrence of the crosstalk.

As described above, the array-type photo module M can be easily and inexpensively manufactured, and, in addition, the high-density array and the low crosstalk can be further coexisted.

In the incident optical fiber, the emitting optical fiber, the gradient-index lens, the opening of the light-shielding member, and the light-receiving element, the arrangement direction and the arrangement interval are the same, and in each wavelength channel of the wavelength division multiplexing signal, the light guiding directions are arranged in a line in parallel to each other, whereby the array-type photo module M can be manufactured more easily and more inexpensively, and, in addition, the high-density array and the low crosstalk can be coexisted.

(Constitution of Light-shielding Member)

Figure 4:
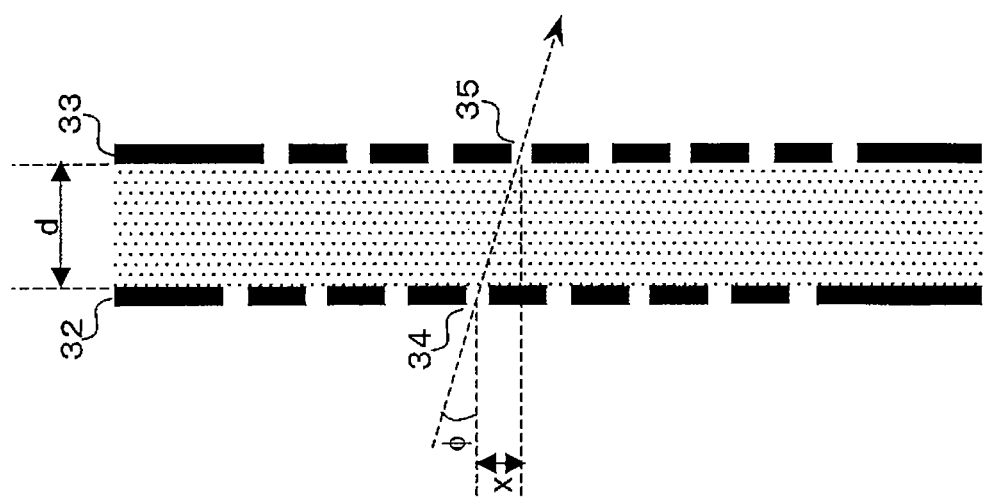
FIG. 4 is a view showing an offset between openings of the light-shielding member.

FIG. 4 shows an offset between the openings 34 and 35 of the light-shielding members 32 and 33. In each of the eight wavelength channels of the wavelength division multiplexing signal, the openings 34 and 35 of the light-shielding members 32 and 33 are arranged on a straight line connecting the transmission position of the filter 31 and the light-receiving element 42. When an interval between the light-shielding members 32 and 33 is represented by d, in each of the eight wavelength channels of the wavelength division multiplexing signal, an angle formed by the light-guiding direction and the light-shielding members 32 and 33 is represented by $\phi$, and the offset between the openings 34 and 35 of the light-shielding members 32 and 33 is represented by x, x=d·tan$\phi$.

Figure 5:
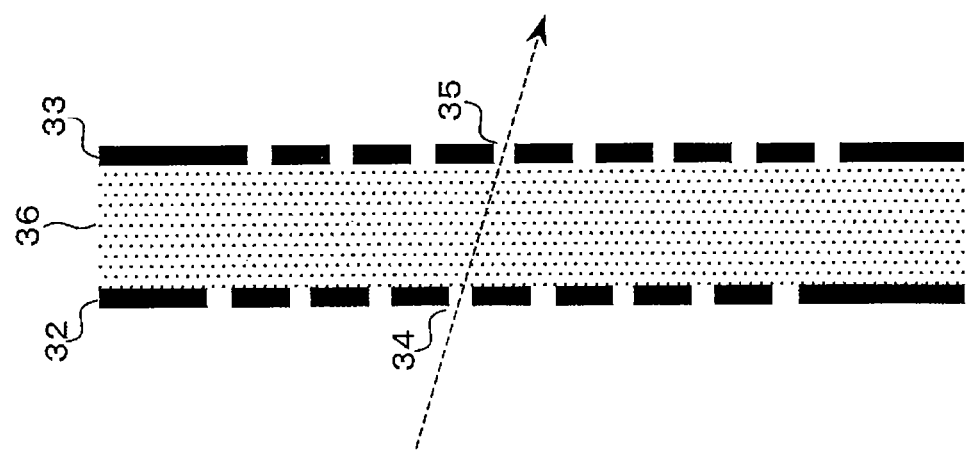
FIG. 5 is a view showing a first process of manufacturing the light-shielding member.

FIG. 5 shows a first process of manufacturing the light-shielding members 32 and 33. First, a pattern of a photoresist corresponding to a pattern of the light-shielding member 32 is formed on a surface of a glass substrate 36, materials to be described later are vacuum-deposited, and the photoresist is dissolved to remove a material formed on the photoresist. Next, a pattern of a photoresist corresponding to a pattern of the light-shielding member 33 is formed on the other surface of the glass substrate 36 based on the offset x described above, materials to be described later are vacuum-deposited, and the photoresist is dissolved to remove a material formed on the photoresist.

Figure 6:
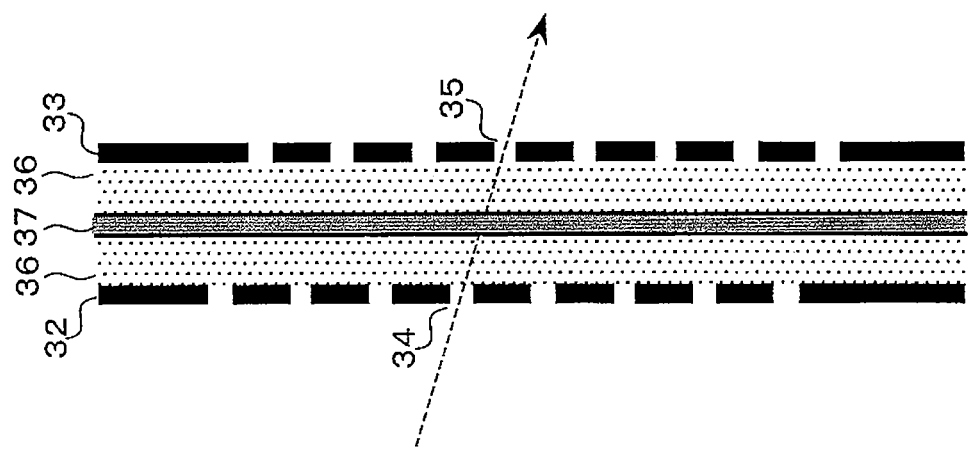
FIG. 6 is a view showing a second process of manufacturing the light-shielding member.
Figure 7:
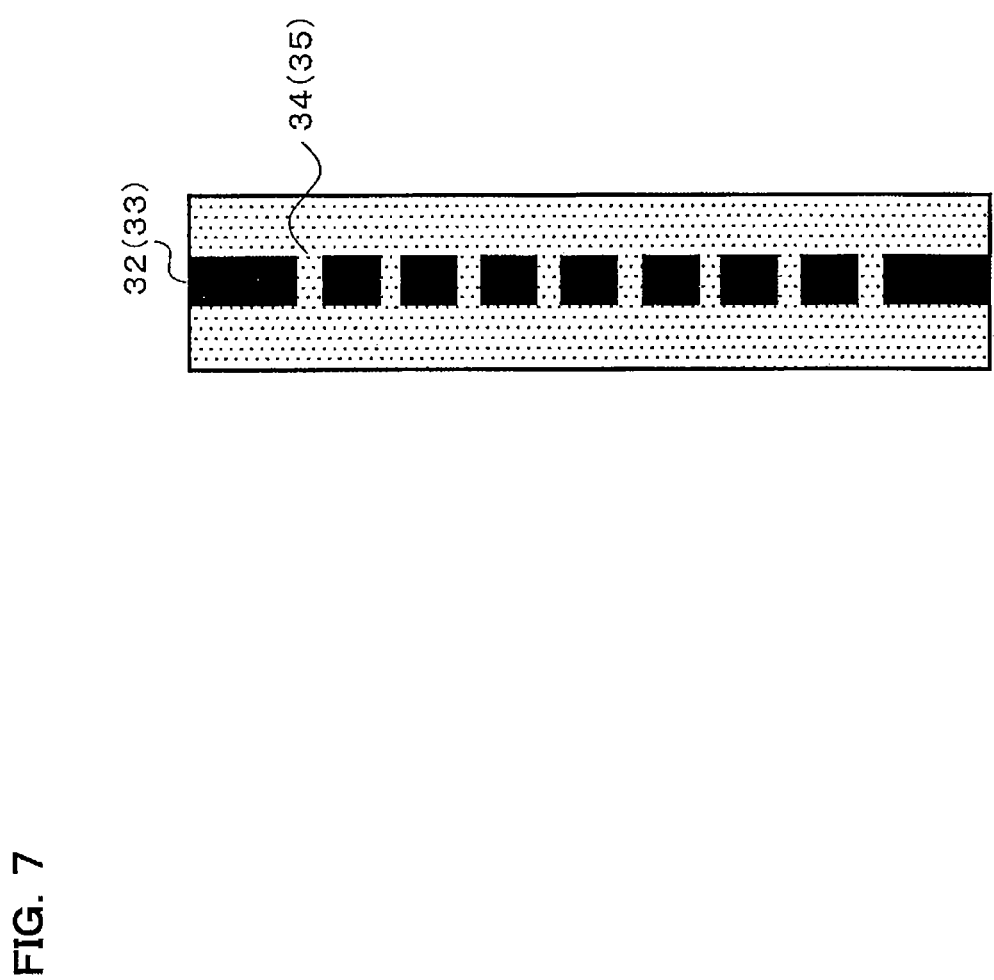
FIG. 7 is a view showing a first constitution of the light-shielding member.
Figure 8:
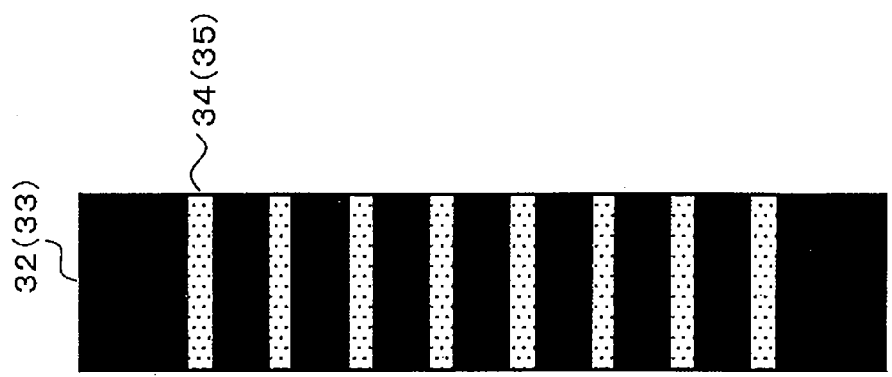
FIG. 8 is a view showing a second constitution of the light-shielding member.
Figure 9:
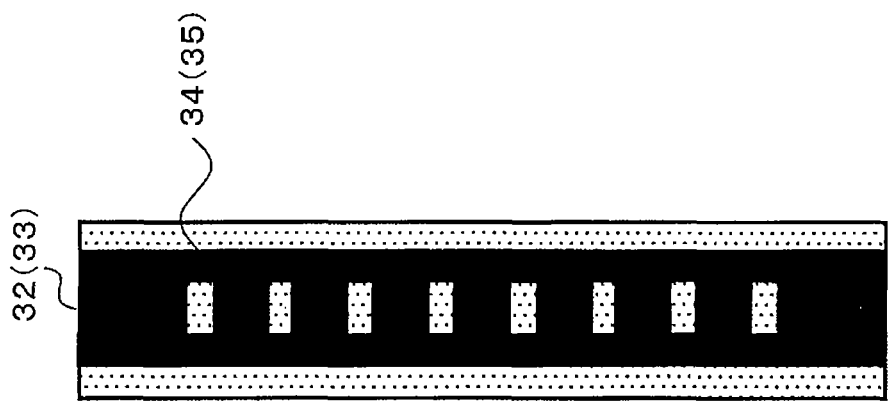
FIG. 9 is a view showing a third constitution of the light-shielding member.
Figure 10:
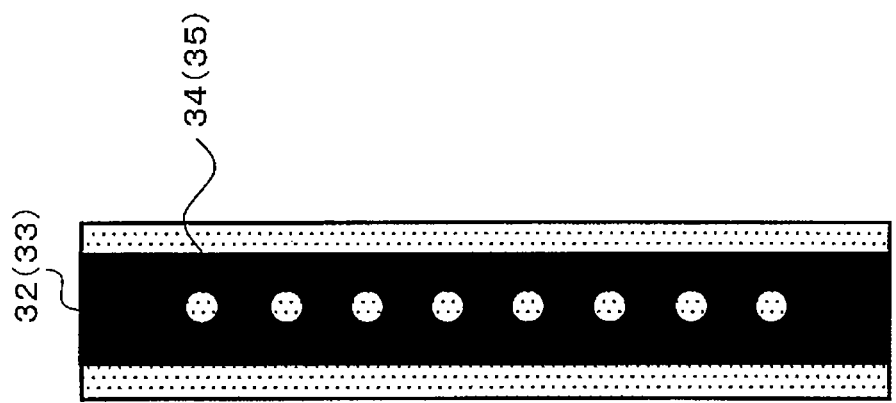
FIG. 10 is a view showing a fourth constitution of the light-shielding member.

FIG. 6 shows a second process of manufacturing the light-shielding members 32 and 33. First, the patterns of the photoresists corresponding to the patterns of the light-shielding members 32 and 33 are formed on the respective one surfaces of the two glass substrates 36, materials to be described later are vacuum-deposited, and the photoresists are dissolved to remove a material formed on the photoresists. Next, in the respective other surfaces of the two glass substrates 36, the two glass substrates 36 are joined based on the offset x described above, using an adhesive 37.

FIGS. 7 to 10 show respectively first to fourth constitutions of the light-shielding members. In FIGS. 7 to 10, the light-guiding direction is the depth direction of paper. It is desirable that the opening width of the openings 34 and 35 of the light-shielding members 32 and 33 is close to a beam diameter of a light beam passing through the openings 34 and 35 of the light-shielding members 32 and 33. This is because if the opening width is smaller than the beam diameter, the received light amount decreases, and if the opening width is larger than the beam diameter, the crosstalk increases.

Although it is considered that the cause of the occurrence of the crosstalk is that the diameter and the expansion width of the light beam are large in comparison with the interval of the light-receiving element 42, multiple reflection of the light beam may occur between the filter 31 and the light-receiving element 42. Thus, the transmission and the interface reflection in the light-shielding members 32 and 33 are suppressed.

The light-shielding members 32 and 33 have a multi-layer structure including at least one of a $SiO_2$ film and a $Ta_2O_5$ film and a Ti film. Namely, the light-shielding members 32 and 33 have a multi-layer structure including the $SiO_2$ film and the Ti film, a multi-layer structure including the $Ta_2O_5$ film and the Ti film, or a multi-layer structure including the $SiO_2$ film, the $Ta_2O_5$ film, and the Ti film. As long as the light-shielding members 32 and 33 suppress the transmission and the interface reflection, the thickness and the stacking sequence of the films described above are not limited, and the materials of the films are not limited to the above. In the present embodiment, the multi-layer structure including the $SiO_2$ film, the $Ta_2O_5$ film, and the Ti film is used.

Figure 11:
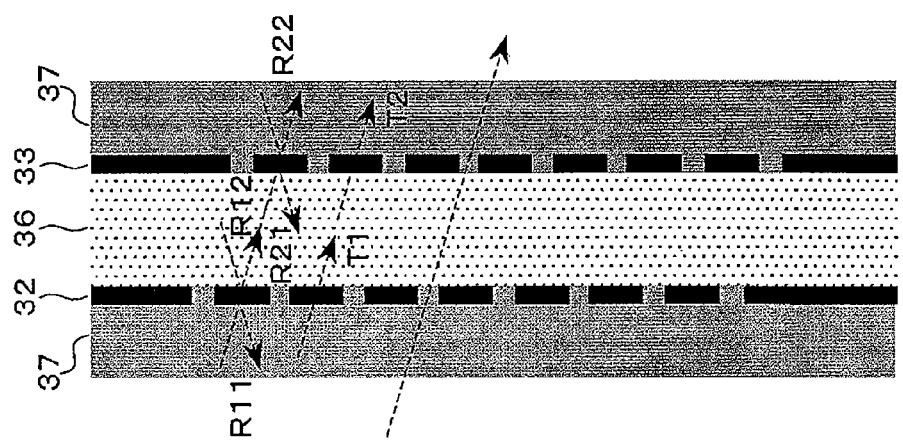
FIG. 11 is a view showing a definition of a transmission component and a reflection component of the light-shielding member.

FIG. 11 shows a definition of a transmission component and a reflection component of the light-shielding member. In FIG. 11, the light-shielding members 32 and 33 of FIG. 5 are joined to other components of FIG. 1, using the adhesive 37. T1 represents the transmission component in the light-shielding member 32 when an incident medium and an emission medium are the adhesive 37 and the glass substrate 36, respectively. T2 represents the transmission component in the light-shielding member 33 when the incident medium and the emission medium are the glass substrate 36 and the adhesive 37, respectively. R11 represents the reflection component in the light-shielding member 32 when the incident and emission media are the adhesive 37. R12 represents the reflection component in the light-shielding member 32 when the incident and emission media are the glass substrate 36. R21 represents the reflection component in the light-shielding member 33 when the incident and emission media are the glass substrate 36. R22 represents the reflection component in the light-shielding member 33 when the incident and emission media are the adhesive 37.

The numerical values of the transmission component and the reflection component of the light-shielding member are calculated as follows. First, in a joint body obtained by joining the glass substrate 36 formed with the light-shielding member and the glass substrate 36 with no light-shielding member with the use of the adhesive 37, a joint body obtained by joining the glass substrates 36 with no light-shielding member each other with the use of the adhesive 37, and a single glass substrate 36, the transmission component and the reflection component are measured in an air medium. Next, by virtue of the use of the transmission component and the reflection component, the numerical values of the transmission components T1 and T2 and the reflection components R11, R12, R21, and R22 of the light-shielding member are calculated based on the multiple reflection theory.

FIG. 12 shows the numerical values of the transmission component and the reflection component of the light-shielding member. In any wavelength channel of the wavelength division multiplexing system, the transmission components T1 and T2 of the light-shielding member is approximately 0, and the reflection components of R11, R12, R21, and R22 of the light-shielding member are suppressed to even or less than 0.55%.

(Constitution of Filter)

As the important characteristics of the filter 31 extracting a light-receiving signal, in addition to the transmission property and the reflection property of the filter 31, there is the polarization property associated with the transmission property and the reflection property of the filter 31. Thus, even when the light beam obliquely enters the filter 31, with regard to the transmission property and the reflection property of the filter 31, polarization dependence can be suppressed inexpensively by a simple film structure.

The filter 31 has the multi-layer structure including at least one of the $SiO_2$ film and the $Ta_2O_5$ film and the Si film or the multi-layer structure including at least one of the $SiO_2$ film and the $Ta_2O_5$ film and an Au film. Namely, the filter 31 has a multi-layer structure including the Si film and the $SiO_2$ film, a multi-layer structure including the Si film and the $Ta_2O_5$ film, a multi-layer structure including the Si film, the $SiO_2$ film, and the $Ta_2O_5$ film, a multi-layer structure including the Au film and the $SiO_2$ film, a multi-layer structure including the Au film and the $Ta_2O_5$ film, or a multi-layer structure including the Au film, the $SiO_2$ film, and the $Ta_2O_5$ film. In the filter 31, as long as polarization dependence is suppressed with regard to the transmission property and the reflection property of the filter 31, the thickness and the stacking sequence of the films described above are not limited, and the materials of the films are not limited to the above.

The numerical values of the transmission component and the reflection component of a filter are calculated as follows. First, in a joint body obtained by joining a glass substrate formed with the filter and a glass substrate with no filter with the use of an adhesive, a joint body obtained by joining the glass substrates with no filter each other with the use of the adhesive, and a single glass substrate, the transmission component and the reflection component are measured in an air medium. Next, by virtue of the use of the transmission component and the reflection component, the numerical values of the transmission component and the reflection component of the filter in a case where the incident medium and the emission medium are the adhesive and the glass substrate, respectively are calculated based on the multiple reflection theory. The oblique incidence angle of the light beam with respect to the filter 31 is 8 degrees.

FIG. 13 shows the numerical values of the reflection component, the transmission component, and the polarization characteristics of the filter. A first filter as the present embodiment has the multi-layer structure including the Si film and the $SiO_2$ film. A second filter as the present embodiment has the multi-layer structure including the Au film, the $SiO_2$ film, and the $Ta_2O_5$ film. A third filter as a comparative example has the multi-layer structure including the $SiO_2$ film and the $Ta_2O_5$ film. In the third filter as the comparative example, in any wavelength channel of the wavelength division multiplexing system, the polarization dependence property of the transmission property and the reflection property of the filter remains. In the first and second filters as the present embodiment, in any wavelength channel of the wavelength division multiplexing system, the polarization dependence property of the transmission property and the reflection property of the filter is suppressed.

(Process of Manufacturing Array-type Photo Module)

The optical fiber array 1 will be described. The incident optical fiber 11 and the emitting optical fiber 12 are single-mode optical fibers. The number of cores of the incident optical fiber 11 and the emitting optical fiber 12 is 8. The clad outer diameter is 125 μm. The optical fiber array 1 is a tape optical fiber or the like.

The gradient-index lens array 2 will be described. The outer diameter of the gradient-index lens 21 is restricted by the alignment interval of the light-receiving element 42 so that the alignment direction and the alignment interval in the gradient-index lens 21 and the light-receiving element 42 are the same. The maximum light-receiving angle (Numerical Aperture: NA) of the gradient-index lens 21 is selected as follows within a range where the outer diameter of the gradient-index lens 21 is restricted.

When the NA is too small relative to the outer diameter, the effect of confining the light beam in the gradient-index lens 21 is reduced to lead to increase in optical loss. When the NA is too large relative to the outer diameter, the beam diameter of the light beam transmitting through the filter 31 becomes small. In this case, the light beam is diffused until reaching the light-receiving element 42 to lead to deterioration of a light reception sensitivity and the crosstalk, and, in addition, the x/4 cycle length is reduced; therefore, a requirement of a processing accuracy becomes difficult to raise the difficulty at the time of manufacturing. Accordingly, considering the height of the performance and the easiness of manufacturing, it is desirable that the outer diameter is satisfactorily increased even or less than the alignment interval of the light-receiving element 42. It is desirable that with respect to the outer diameter restricted thus, the NA is reduced within a range in which the light beam is fitted into a light-receiving area of the light-receiving element 42.

In the light-receiving element 42, the alignment interval is 250 μm, and the light-receiving area is 80 μmφ. In the gradient-index lens 21, the number is 8, the cycle length is x/4 =¼, the lens outer diameter is 245 μm, the lens effective diameter is 205 μm, the central refractive index is 1.47 to the light beam with a wavelength of 1550 nm, and the NA is 0.29.

The joining between the optical fiber array 1 and the gradient-index lens array 2 will be described. The end of the optical fiber array 1 and the end of the gradient-index lens array 2 are polished in the opposite direction by the same oblique angle and joined using an adhesive. Consequently, reflected light due to a refractive index difference between the optical fiber array 1 and the adhesive and a refractive index difference between the gradient-index lens array 2 and the adhesive is suppressed.

The joining between the gradient-index lens array 2 and the filter 31 will be described. The filter 31 has the multi-layer structure including the Si film and the $SiO_2$ film, and TAP rate at this time is 7%. A glass substrate formed with the filter 31 is cut into the same area as the gradient-index lens array 2 and then cleaned and dried. An end of the gradient-index lens array 2 is cleaned. An end on the filter 31 side of the glass substrate is joined to the end of the gradient-index lens array 2, using an adhesive. The plate thickness of the glass substrate formed with the filter 31 is 0.5 mm. Namely, the interval between the filter 31 and the light-shielding member 32 is 0.5 mm.

The joining between the filter 31 and the light-shielding members 32 and 33 will be described. The light-shielding members 32 and 33 have the multi-layer structure including the SiO$_2$ film, the Ta$_2$O$_5$ film, and the Ti film. A glass substrate formed with the light-shielding members 32 and 33 is cut into the same area as the gradient-index lens array 2 and then cleaned and dried. An end on the light-shielding member 32 side of the glass substrate is jointed to an end of the glass substrate, formed with the filter 31, on the opposite side of the filter 31 with the use of an adhesive. At that time, the laser beam is entered the incident optical fiber 11 to be emitted from the opening 35 of the light-shielding member 33, and, thus, to increase the emission strength of each wavelength channel. The plate thickness of the glass substrate formed with the light-shielding members 32 and 33 is 0.5 mm. Namely, the interval between the light-shielding members 32 and 33 is 0.5 mm. Meanwhile, the opening width of the openings 34 and 35 of the light-shielding members 32 and 33 is 70 μm.

A joint body obtained by joining the optical fiber array 1, the gradient-index lens array 2, and the light-shielding member package 3 is jointed to a transparent window material of a front surface of the light-receiving element package 4 with the use of an adhesive. At this time, the laser beam is entered the incident optical fiber 11 to be received by the light-receiving element 42, and, thus, to increase the light-receiving strength in each wavelength channel.

(Characteristics of Array-type Photo Module)

The measuring result of the characteristics of the array-type photo module M before the joining of the light-receiving element package 4 is shown. FIG. 14 shows the numerical values of an optical loss amount of the array-type photo module. When the strength of the laser beam with a wavelength of 1550 nm entering the incident optical fiber 11 is represented by Pin, and the strength of the laser beam with a wavelength of 1550 nm emitted from the emitting optical fiber 12 is represented by Pout, an optical loss amount IL is represented by IL(dB)=−10×log (Pout/Pin). In all the wavelength channels, if the optical loss due to the TAP rate of the filter 31 is included, a good optical loss amount of even or less than 0.55 dB can be obtained.

Figure 15:
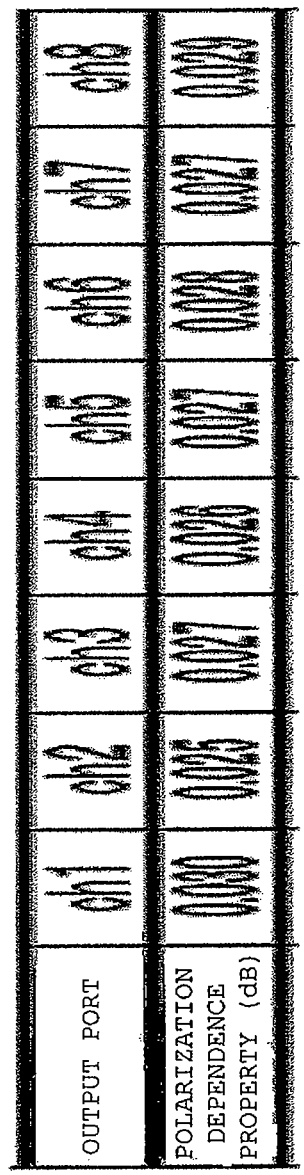
FIG. 15 is a view showing numerical values of polarization characteristics of the array-type photo module.

FIG. 15 shows the numerical vales of the polarization characteristics of the array-type photo module. When the laser beam with a wavelength of 1550 nm having a first linear polarization enters, the strength of the laser beam emitted from the opening 35 of the light-shielding member 33 is represented by P1, and when the laser beam with a wavelength of 1550 nm having a second linear polarization perpendicular to the first linear polarization enters, the strength of the laser beam emitted from the opening 35 of the light-shielding member 33 is represented by P2, polarization dependence property PDR is represented by PDR (dB)=−10× log(P1/P2). In all the wavelength channels, good polarization dependence property of even or less than 0.03 dB can be obtained, and the effectiveness of the filter 31 is confirmed.

Figure 19:
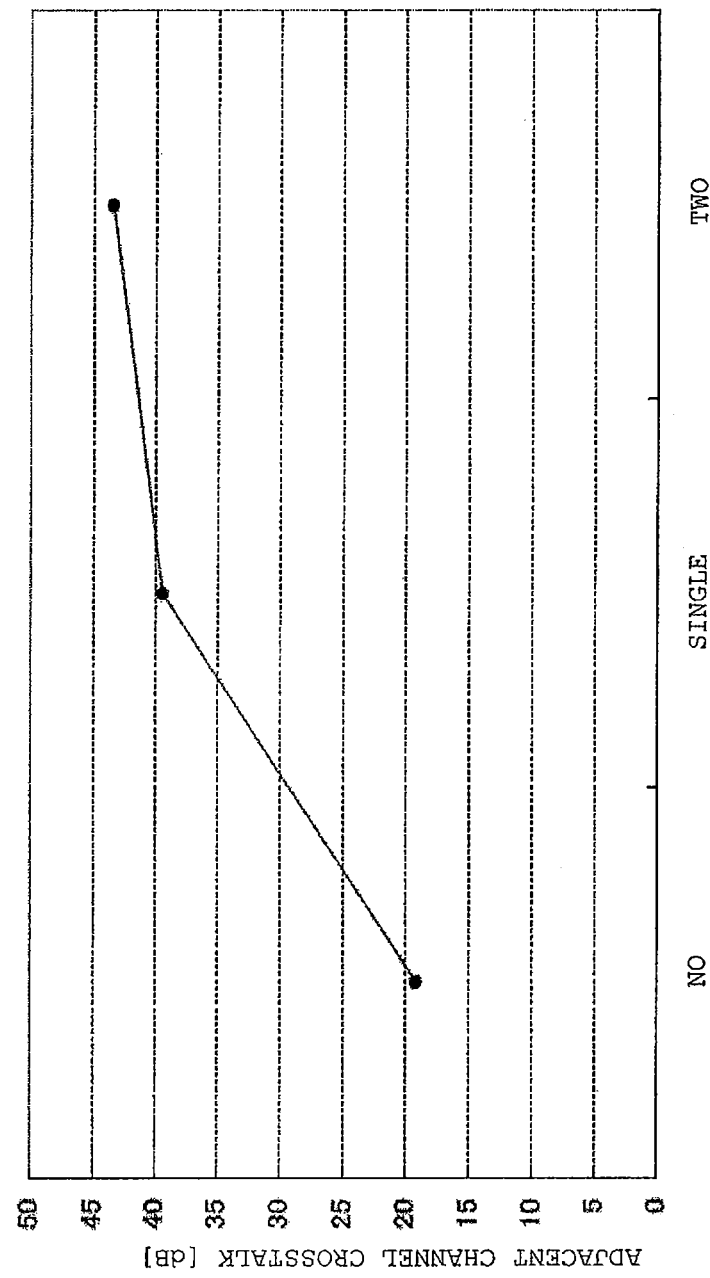
FIG. 19 is a view showing numerical values of the adjacent crosstalk with respect to the arranging number of the light-shielding members.

The measuring result of the characteristics of the array-type photo module M after the joining of the light-receiving element package 4 is shown. FIG. 16 shows the numerical values of the adjacent crosstalk when two light-shielding members are arranged. FIG. 17 shows the numerical values of the adjacent crosstalk when a single light-shielding member is arranged. FIG. 18 shows the numerical values of the adjacent crosstalk when no light-shielding member is arranged. FIG. 19 shows the numerical values of the adjacent crosstalk with respect to the arrangement number of the light-shielding member.

When the laser beam with a wavelength of 1550 nm enters the incident optical fiber 11 in a certain wavelength channel, the light-receiving strength at the light-receiving element 42 in the relevant wavelength channel is represented by P (relevant), and the light-receiving strength at the light-receiving element 42 in the adjacent wavelength channel adjacent to the relevant wavelength channel is represented by P (adjacent). In this case, an adjacent crosstalk amount AXT (adjacent) is represented by AXT (adjacent) (dB)=−10×log {P (adjacent)/P (relevant)}.

FIG. 19 shows average values of the adjacent crosstalk amount in all the wavelength channels in each case in FIGS. 16 to 18. In the case of FIG. 16 where two light-shielding members are arranged, good adjacent crosstalk amount of not less than 40 dB can be obtained in all the wavelength channels. In comparison with the case of FIG. 17 where a single light-shielding member is arranged, the adjacent crosstalk amount is improved by approximately 5 dB. In comparison with the case of FIG. 18 where no light-shielding member is arranged, the adjacent crosstalk amount is improved by approximately 20 dB. Accordingly, the effectiveness of the light-shielding member is confirmed, and it is confirmed that the larger the number of the light-shielding members, the lower the crosstalk.

In the present embodiment, in each wavelength channel of the wavelength division multiplexing signal, the strength of the light passing through the light-shielding member is measured. However, as a variation, in each channel that is not limited to each wavelength channel of the wavelength division multiplexing signal, such as each channel separated spatially, the strength of the light passing through the light-shielding member may be measured.

In the present embodiment, the light-shielding member 32 is arranged to be spaced from the filter 31, and the light-receiving element array 41 is arranged to be spaced from the light-shielding member 33. However, as a variation, the light-shielding member 32 may be arranged to be in contact with the filter 31, and the light-receiving element array 41 may be arranged to be in contact with the light-shielding member 33. In both the present embodiment and the variation, in each wavelength channel of the wavelength division multiplexing signal, the light-shielding members 32 and 33 may include the openings 34 and 35 on a straight line connecting the transmission position in the filter 31 and the light-receiving element 42.

INDUSTRIAL APPLICABILITY

The array-type photo module according to the present invention can significantly reduce a mounting cost in the wavelength-division multiplexing system, and it is possible to contribute significantly to long distance and large capacity transmission and economization of next-generation access system. The larger the number of the wavelength channels, the lower the manufacturing cost per the wavelength channel.

DESCRIPTION OF REFERENCE SIGNS

M: array-type photo module
1: optical fiber array
2: gradient-index lens array
3: light-shielding member package
4: light-receiving element package
11: incident optical fiber
12: emitting optical fiber
21: gradient-index lens
31: filter
32,33: light-shielding member
34, 35: opening
36: glass substrate
37: adhesive 41: light-receiving element array
42: light-receiving element

The invention claimed is:

1. An array-type photo module, comprising:
an optical fiber array which, in each channel, has a pair of an incident optical fiber guiding incident light and an emitting optical fiber guiding emitting light;
a gradient-index lens array which, in each channel, has a gradient-index lens of approximately x/4 cycle length (x is an odd number), which is joined to an emitting end of the incident optical fiber and an incident end of the emitting optical fiber and has at its central axis a symmetric axis of an optical axis of the emitting light from the incident optical fiber and the optical axis of the incident light to the emitting optical fiber;
a filter which is joined to an opposite end of the optical fiber array of the gradient-index lens array, and in each channel, transmits therethrough a portion of the emitting light from the incident optical fiber on the opposite side of the gradient-index lens array and reflects another portion of the emitting light from the incident optical fiber toward the gradient-index lens array; and
a light-shielding member which is arranged on the opposite side of the gradient-index lens array of the filter, and in each channel, has an opening through which transmitted light from the filter passes on the opposite side of the filter;
wherein the light-shielding member is a plurality of light-shielding members arranged to be spaced from each other, and in each channel, the opening of the plurality of light-shielding members and the transmission position of the filter are arranged on a straight line.

2. An array-type photo module, comprising:
an optical fiber array which, in each channel, has a pair of an incident optical fiber guiding incident light and an emitting optical fiber guiding emitting light;
a gradient-index lens array which, in each channel, has a gradient-index lens of approximately x/4 cycle length (x is an odd number), which is joined to an emitting end of the incident optical fiber and an incident end of the emitting optical fiber and has at its central axis a symmetric axis of an optical axis of the emitting light from the incident optical fiber and the optical axis of the incident light to the emitting optical fiber;
a filter which is joined to an opposite end of the optical fiber array of the gradient-index lens array, and in each channel, transmits therethrough a portion of the emitting light from the incident optical fiber on the opposite side of the gradient-index lens array and reflects another portion of the emitting light from the incident optical fiber toward the gradient-index lens array; and
a light-shielding member which is arranged on the opposite side of the gradient-index lens array of the filter, and in each channel, has an opening through which transmitted light from the filter passes on the opposite side of the filter;
wherein in the incident optical fiber and the emitting optical fiber of the optical fiber array, the gradient-index lens of the gradient-index lens array, and the opening of the light-shielding member, the arrangement direction and the arrangement interval are the same.

3. An array-type photo module, comprising:
an optical fiber array which, in each channel, has a pair of an incident optical fiber guiding incident light and an emitting optical fiber guiding emitting light;
a gradient-index lens array which, in each channel, has a gradient-index lens of approximately x/4 cycle length (x is an odd number), which is joined to an emitting end of the incident optical fiber and an incident end of the emitting optical fiber and has at its central axis a symmetric axis of an optical axis of the emitting light from the incident optical fiber and the optical axis of the incident light to the emitting optical fiber;
a filter which is joined to an opposite end of the optical fiber array of the gradient-index lens array, and in each channel, transmits therethrough a portion of the emitting light from the incident optical fiber on the opposite side of the gradient-index lens array and reflects another portion of the emitting light from the incident optical fiber toward the gradient-index lens array; and
a light-shielding member which is arranged on the opposite side of the gradient-index lens array of the filter, and in each channel, has an opening through which transmitted light from the filter passes on the opposite side of the filter;
wherein the light-shielding member has a multi-layer structure including at least one of a $SiO_2$ film and a $Ta_2O_5$ film and a Ti film.

4. An array-type photo module, comprising:
an optical fiber array which, in each channel, has a pair of an incident optical fiber guiding incident light and an emitting optical fiber guiding emitting light;
a gradient-index lens array which, in each channel, has a gradient-index lens of approximately x/4 cycle length (x is an odd number), which is joined to an emitting end of the incident optical fiber and an incident end of the emitting optical fiber and has at its central axis a symmetric axis of an optical axis of the emitting light from the incident optical fiber and the optical axis of the incident light to the emitting optical fiber;
a filter which is joined to an opposite end of the optical fiber array of the gradient-index lens array, and in each channel, transmits therethrough a portion of the emitting light from the incident optical fiber on the opposite side of the gradient-index lens array and reflects another portion of the emitting light from the incident optical fiber toward the gradient-index lens array; and
a light-shielding member which is arranged on the opposite side of the gradient-index lens array of the filter, and in each channel, has an opening through which transmitted light from the filter passes on the opposite side of the filter;
wherein the light-shielding member is formed on a surface of a glass substrate.

5. The array-type photo module according to claim 4, further comprising a light-receiving element array which, in each channel, has a light-receiving element, which is arranged on the opposite side of the filter of the light-shielding member, at the same time, arranged on an extended line connecting a transmission position in the filter and the opening of the light-shielding member, and measures a strength of light passing through the light-shielding member.

6. The array-type photo module according to claim 4, wherein the filter has a multi-layer structure including at least one of an $SiO_2$ film and a $Ta_2O_5$ film and a Si film or a multi-layer structure including at least one of the $SiO_2$ film and the $Ta_2O_5$ film and an Au film.

* * * * *